United States Patent
Masood et al.

(10) Patent No.: US 12,517,762 B2
(45) Date of Patent: Jan. 6, 2026

(54) SYSTEMS AND METHODS FOR PROCESS MINING USING UNSUPERVISED LEARNING AND FOR AUTOMATING ORCHESTRATION OF WORKFLOWS

(71) Applicant: UST GLOBAL (SINGAPORE) PTE. LTD., Singapore (SG)

(72) Inventors: Adnan Masood, Temple Terrace, FL (US); Krishnanunni Sreeramabhavan Unnikrishna Pillai, Kerala (IN); Jibu George, Aliso Viejo, CA (US); Ranjith Mohanakumaran Nair, Trivandrum (IN)

(73) Assignee: UST GLOBAL PRIVATE LIMITED, London (GB)

( * ) Notice: Subject to any disclaimer, the term of this patent is extended or adjusted under 35 U.S.C. 154(b) by 930 days.

(21) Appl. No.: 17/631,965

(22) PCT Filed: Aug. 1, 2020

(86) PCT No.: PCT/IB2020/057303
§ 371 (c)(1),
(2) Date: Feb. 1, 2022

(87) PCT Pub. No.: WO2021/024145
PCT Pub. Date: Feb. 11, 2021

(65) Prior Publication Data
US 2022/0291966 A1   Sep. 15, 2022

Related U.S. Application Data

(63) Continuation-in-part of application No. 16/847,313, filed on Apr. 13, 2020, now abandoned.
(Continued)

(30) Foreign Application Priority Data

Nov. 7, 2019   (IN) .............................. 201911045319

(51) Int. Cl.
*G06F 9/50* (2006.01)
*G06F 3/0486* (2013.01)
(Continued)

(52) U.S. Cl.
CPC .......... *G06F 9/5038* (2013.01); *G06F 3/0486* (2013.01); *G06F 9/5072* (2013.01); *G06F 40/143* (2020.01); *G06N 3/044* (2023.01)

(58) Field of Classification Search
None
See application file for complete search history.

(56) References Cited

U.S. PATENT DOCUMENTS

| | | | |
|---|---|---|---|
| 9,588,685 B1 | 3/2017 | Watson | |
| 2006/0074732 A1* | 4/2006 | Shukla | G06Q 10/06 717/106 |

(Continued)

FOREIGN PATENT DOCUMENTS

EP   1643431 A1   4/2006

OTHER PUBLICATIONS

S. Yatskiv, et al., "Improved Method of Software Automation Testing Based on the Robotic Process Automation Technology," 2019 9th International Conference on Advanced Computer Information Technologies (ACIT), Ceske Budejovice, Czech Republic, 2019, pp. 293-296. (Year: 2019).*

(Continued)

*Primary Examiner* — Frank D Mills
(74) *Attorney, Agent, or Firm* — Nixon Peabody LLP

(57) ABSTRACT

A system for discovering business processes using unsupervised learning is configured to: (a) receive multimodal event data from a plurality of sources, the multimodal event data including a plurality of event instances; (b) associate the multimodal event data with a vector representation, such that the plurality of event instances is represented as a (Continued)

plurality of event vectors; (c) correlate the plurality of event vectors using unsupervised learning to identify one or more processes; and (d) generate a process model script for the one or more processes. A method for automated orchestration of a workflow is also disclosed.

20 Claims, 11 Drawing Sheets

Related U.S. Application Data

(60) Provisional application No. 62/882,359, filed on Aug. 2, 2019.

(51) Int. Cl.
*G06F 40/143* (2020.01)
*G06N 3/044* (2023.01)

(56) References Cited

U.S. PATENT DOCUMENTS

| | | |
|---|---|---|
| 2007/0157088 A1 | 7/2007 | Lewis-Bowen |
| 2014/0156337 A1 | 6/2014 | Pechanec |
| 2016/0202959 A1* | 7/2016 | Doubleday ............... G06F 8/71 717/107 |
| 2017/0177703 A1* | 6/2017 | Liu ....................... G06F 16/285 |
| 2017/0206483 A1 | 7/2017 | Fable |
| 2019/0324781 A1* | 10/2019 | Ramamurthy .......... G06F 18/24 |
| 2020/0104721 A1* | 4/2020 | Mori ..................... G06V 10/761 |
| 2020/0206920 A1* | 7/2020 | Ma ..................... G06Q 10/0633 |
| 2021/0004711 A1* | 1/2021 | Gupta ...................... G06N 5/02 |
| 2021/0049489 A1* | 2/2021 | Sait M A ............. G06Q 10/063 |

OTHER PUBLICATIONS

International Search Report and Written Opinion of International Searching Authority for Application No. PCT/IB2020/057303, mailed Oct. 7, 2020 (10 pages).

Chung, Y. et al.; "Audio Word2Vec: Unsupervised Learning of Audio Segment Representations using Sequence-to-Sequence Autoencoder"; College of Electrical Engineering and Computer Science, National Taiwan University; arXiv:1603.00982v4; Jun. 11, 2016 (5 pages).

\* cited by examiner

SYSTEMS AND METHODS FOR PROCESS MINING USING UNSUPERVISED LEARNING AND FOR AUTOMATING ORCHESTRATION OF WORKFLOWS

PRIORITY CLAIM

This application is a U.S. National Stage of International Application No. PCT/IB2020/057303, filed Aug. 1, 2020, entitled "Systems And Methods For Process Mining Using Unsupervised Learning And For Automating Orchestration Of Workflows." which claims priority to and the benefit of U.S. Provisional Patent Application No. 62/882,359, filed Aug. 2, 2019, entitled "Systems and Methods of Automating Operations Including Next Best Action Recommendations by Leveraging Workflow Mining, AI Democratization, Automated Preprocessor Selection," and this application is also a continuation-in-part of and claims priority to and the benefit of U.S. patent application Ser. No. 16/847,313, filed Apr. 13, 2020, entitled "Systems and Methods For Process mining Using Unsupervised Learning," which claims priority to and the benefit of India Provisional Patent Application No. 201911045319, filed Nov. 7, 2019, each of which is hereby incorporated by reference herein in their respective entirety.

TECHNICAL FIELD

The present disclosure relates to orchestration of workflows and to process mining using unsupervised learning and more specifically to systems and methods that extract micro tasks or events from structured and/or unstructured data and automatically orchestrate one or more process flows or workflows from the micro tasks.

BACKGROUND

A business enterprise includes multiple facets that work together to achieve a plurality of goals. The business enterprise can include multiple departments with different operational protocols, for example, the business enterprise can include an information technology (IT) department, an accounting department, a human resources (HR) department, a marketing department, a legal department, a research and development department, a customer service department, etc. Each of these departments can be subdivided into sub-departments which can be further subdivided into business units or groups.

Two or more of these business units or groups can coalesce to achieve an operational goal of the business enterprise. In some situations, the departmental subdivisions end up creating a logical hierarchical arrangement of the business units or groups, such that information flow between groups can be dictated by an escalation of matters from a group lower in the hierarchy to a group higher up in the hierarchy. As business enterprises mature and evolve in response to challenges they face within their industries, interactions between business groups can change. New business groups can be added, old ones can be removed, in-place protocols and processes used within and between business groups can be modified, new software can be adopted, departments can be outsourced, etc. These changes, if not monitored throughout a lifespan of a business enterprise, can result in numerous inefficiencies that can affect the business enterprise's effectiveness in meeting its goals. The present disclosure provides systems and methods that address difficulties relating to inefficiencies in monitoring processes within business enterprises.

Moreover, conventional orchestration platforms are highly focused on DevOps (as that term is understood in the information technology (IT) arena) or are containerization-specific, and in general do not focus on business process workflow automation. Others focus on cluster managers and schedulers, or provide a platform for running a private container service. These orchestration platforms cannot and do not purport to automatically orchestrate an entire workflow of a business process. Beyond the focus, conventional orchestration platforms are built with a singular domain of operations in mind. ITOps and other digital transformation technologies, on the one hand, and general business processes, on the other hand, are very different from one another, calling for different toolsets, functionalities, workflows, lifecycles, modalities, and the like.

Examples of digital business transformations include AIOps, BizDevOps, CloudOps, DevOps, ITOps, and NoOps, as those terms are commonly understood to persons skilled in the art of information technology (IT). These technologies can be leveraged to transform business processes into fully automated or automation-enhanced processes. What is needed is a software platform that enables automatic orchestration of workflows across multiple domains.

SUMMARY

Some implementations of the present disclosure provide a system for discovering business processes using unsupervised learning. The system includes a non-transitory computer-readable medium storing computer-executable instructions thereon such that when the instructions are executed, the system is configured to: (a) receive multimodal event data from a plurality of sources, the multimodal event data including a plurality of event instances; (b) associate the multimodal event data with a vector representation, such that the plurality of event instances is represented as a plurality of event vectors; (c) correlate the plurality of event vectors using unsupervised learning to identify one or more processes; and (d) generate a process model script for the one or more processes.

Some implementations of the present disclosure provide a method for discovering business processes using unsupervised learning including: (a) receiving multimodal event data from a plurality of sources, the multimodal event data including a plurality of event instances; (b) associating the multimodal event data with a vector representation, such that the plurality of event instances is represented as a plurality of event vectors; (c) correlating the plurality of event vectors using unsupervised learning to identify one or more processes; and (d) generating a process model script for the one or more processes.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
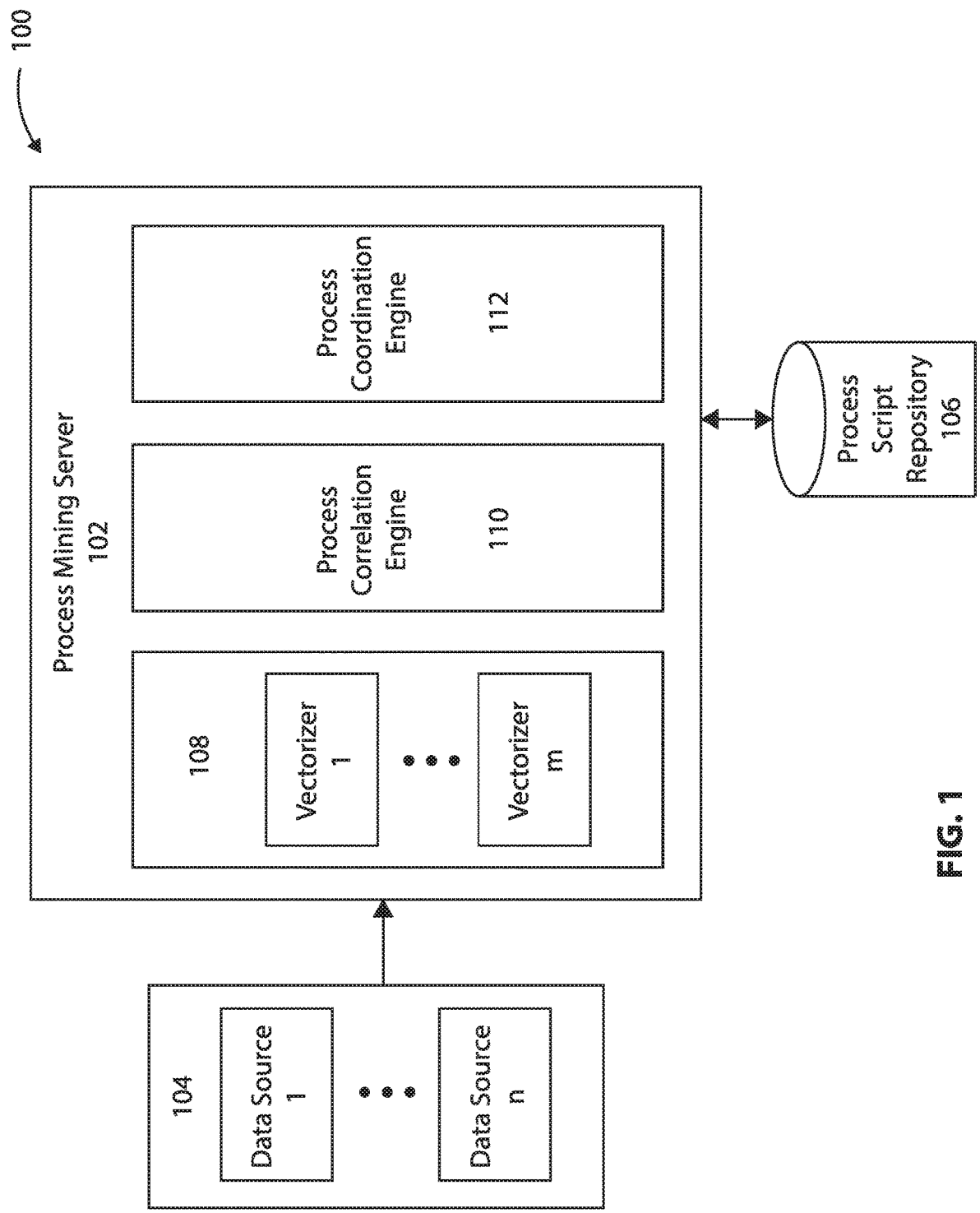
FIG. 1 illustrates a block diagram of a system for discovering business processes according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Process compression is a method by which a business process realized as a workflow or skill is optimized through decomposition by reducing, reordering, or changing the events, activities, connections, tasks, etc. involved in carrying out the subprocesses to execute or orchestrate a process, which can be graphically represented in Business Process Model and Notation (BPMN). Today, many aspects of a business process involve computers and data, and human interactions with those computers and data. Traditional approaches to optimize a business process myopically focus on automating specific activities of the business process, without taking a broader perspective of the entire business process for process compression opportunities from end-to-end (e.g., from a start event of a business process to an end event of the business process, and all activities in between).

Processes are comprised of tasks, and several methods have been proposed for process mining within an IT framework. For example, an IT infrastructure with thousands of servers can use distributed processing to respond to requests from customers. A specific request from a customer can be determined to take too long to handle because a dependent process running on another server is taking time. In IT, the dependent process can be identified as a bottleneck. Using statistical techniques, processes in an IT environment can be correlated to determine and anticipate a chain of disastrous events, that is, find defects or areas where an IT process can fail. That way, an IT team can intervene to effectively solve problems related to the chain or avoid the chain completely. The IT context uses log files from webservers, application servers, and service fabrics for the correlation.

Determining and anticipating the chain of disastrous events in traditional IT environments involves correlating events. Events are correlated using a rule based technique, a model based technique, a case based technique, a codebook, or a state transition correlation. None of these techniques for correlation involves learning. For example, the rule base technique involves following a graphed rule, the model based technique involves combining multiple rules to create a model, the case based technique involves creating branches in rules to accommodate case-by-case departures, the codebook is a set of rules, and the state transition correlation involves using automata in correlation. Furthermore, traditional techniques to event correlation are apriori. Traditional inputs to event correlators are set of events which include event logs, traces and sequences. Each event has a number of attributes or features (e.g., topological, numerical, text, etc.). Traditional outputs of event correlators are a list of ideal groups with characteristic metadata of each group. These traditional techniques do not learn, and their input sources are limited to structured log files.

Moreover, data involved in a business process increasingly is multimodal. Multimodal (or sometimes called multichannel) data is data that has different modes from or by which the data is perceived or given meaning. For example, documents are one type of modality, the contents of which are perceived through human sight and then understanding. Speech or audio are another type of modality, which are perceived through human hearing. Images are another type of modality, which is perceived through human sight. Videos are another type of modality, which is perceived through a combination of human sight and hearing. Other modalities of data are generated by machines, such as tickets or event logs, which are meaningful to other machines. Ingesting these different modalities of data, which involve different sensory organs and indeed even other machines, creating associations or relationships among the multimodal data sets, and contextualizing the different modalities relative to one another are non-trivial, but highly critical endeavors in harnessing unsupervised learning and other artificial intelligence to expose insights. Insights exposed would be impossible or hopelessly inefficient for a human to try to do given the insurmountably massive volumes of multimodal data sets involved in a business process and the effectively infinite permutations to be parsed and assessed, which can number in the billions, trillions, and even higher.

Embodiments of the present disclosure provide a system and method utilizing unsupervised learning to discover business processes. Within a business enterprise, a business process can involve activities and tasks undertaken by more than one business group. The activities or tasks can be undertaken in sequential order or in parallel. The activities or tasks can require a coordination between two or more business groups. While implementing a process involving more than one business group, tasks within a first business group can be opaque to other business groups even though the other business groups need to coordinate with the first business group. Embodiments of the present disclosure identify and extract tasks and micro-tasks from multiple modalities of data (multimodal data). Incorporating multimodal data allows a holistic view of the business process, providing insights into activities undertaken in each business group involved in the business process. As used herein, tasks can be embodied as one or more micro actions, according to the present disclosure. An extracted or mined business process can be automatically stored as a workflow, according to the present disclosure.

Embodiments of the present disclosure provide a system and method for correlating events across multiple different modalities to map out business process instances and compare them for similarities, disjointedness, anomalies, and/or prediction. Correlating events to map out business process instances can provide a comprehensive view for building the business process. In some implementations, business process instances are represented as vectors such that computational techniques can be applied to the vectors to determine similarities between the business process instances. This computational approach to analyzing business processes enables combining statistical methods and event correlation using unsupervised learning.

Compared to the traditional IT environment previously described, embodiments of the present disclosure use unsupervised learning for process mining. Statistical methods of the IT environment break down because business processes are more complex than IT processes. For example, business processes involve multimodal data analysis of structured and unstructured data. Business processes can involve many events that do not lend themselves to actual sequences. As such, statistical methods of the IT environment are unable to effectively find sequences in business processes. Embodiments of the present disclosure use computational approaches therefore bypassing drawbacks associated with traditional statistical methods applied to the IT environment.

Embodiments of the present disclosure extract business process models by correlating individual business process events from multiple data sources to build a comprehensive view of a business process event sequence. The business process event sequence represents a singular business process instance as occurred in real life. Overlap and similarity between business process instances can be used to build a business process trunk. In some implementations, probabilities of departures from the business process trunk are determined based on the number of business process instances.

Process correlation performed according to some embodiments of the present disclosure can combine statistical event correlation and domain-based correlation by building vectorized representations of business processes. The vectorized representations can then be used to perform similarity analysis, correlation, and other process mining tasks for various domains, including but not limited to network security, intrusion detection systems, financial fraud detection, logistical outlier detection, etc.

FIG. 1 illustrates a block diagram of a system 100 for discovering business processes according to some implementations of the present disclosure. To simplify discussion, the singular form will be used for components identified in FIG. 1 when appropriate, but the use of the singular does not limit the discussion to only one of each such component. The system 100 includes a process mining server 102, one or more data sources 104, and a process script repository 106. Each of these components can be realized by one or more computer devices and/or networked computer devices. The computer devices include at least one processor with at least one non-transitory computer readable medium. The non-transitory computer readable medium can store computer-executable instructions that, when executed by the at least one processor, enables functionality described herein with respect to each of the aforementioned components. Examples of the process mining server 102 includes a computer, a server, an application specific integrated circuit, a field programmable gate array, or any combination thereof.

The one or more electronic data sources 104 are depicted in FIG. 1 as data source 1, . . . data source n. The one or more data sources 104 can store structured and unstructured data. Examples of structured data include data logs, event logs, application logs, documents organized as key-value pairs, etc. Examples of unstructured data sources include images, sound inputs, and documents not organized as key-value pairs. The one or more data sources 104 can separate each data source by modalities. For example, data source 1 can include keystroke data logs, data source 2 can include Internet Information Services (IIS) log files, data source 3 can include Apache log files, data source 4 can include one or more application log files, data source 5 can include one or more standard operating procedure (SOP) manuals, data source 6 can include one or more screen capture logs, data source 7 can include one or more business process documents (BPDs), etc. The one or more data sources 104 can provide structured and unstructured data as log files, images, video, control sequences, etc.

In some implementations, a business enterprise collects keystroke activity in keystroke data logs. Employees' computers can include programs that monitor keystrokes and save the keystrokes in the keystroke data logs. An entry in the keystroke data log can include a timestamp for when a key was pressed, the specific key that was pressed, the user, cursor location, etc. A keystroke data log can contain entire context of application (i.e., application telemetry, active window information, process ID, executing process list, window index, positioning, activity status, visual indices, mouse and other input devices information, application visuals, operating system attributes, etc.) Key press, mouse clicks, and other data collected can be application dependent. Although described in the context of keystrokes, logs of other human computer interaction (HCI) input devices are included. For example, mouse clicks, trackpad positions, touchscreen taps, voice inputs, augmented reality inputs, virtual reality inputs, mixed reality inputs, etc., can be monitored. Examples of employees' computers include desktop computers, laptop computers, smartphones, tablets, etc.

In some implementations, a business enterprise has one or more SOP manuals. The one or more SOP manuals can include tasks or events grouped into one or more processes. For example, an SOP manual in an HR department can include processes for declaring a position vacant, creating a newly established position, advertising a vacant position, etc. An SOP manual for security verification can include processes for clearing visitors to provide them access to resources, issuing badges to employees, tracking changes in employment status, etc. SOP manuals are usually written by humans, indicating steps that should be taken for each identified process.

Similar to the SOP manuals, in some implementations, a business enterprise has one or more BPDs. BPDs provide a sequence of activities for performing specific business services and can be used to standardize procedures and establish best practices. BPDs can include both text and images. In some cases, the images are flow charts with text descriptions of steps in the flow charts.

In some implementations, a business enterprise can collect one or more screen captures. Similar to keystroke logs, the business enterprise can have a background program installed on employees' computers to extract images in sequence as employees perform their duties. The screen captures can be analyzed as a video stream or can be analyzed as individual images.

In some implementations, a business enterprise can collect structured log data in the form of one or more of IIS log files, Apache log files, or application log files. These log files can include a timestamp, a user handle, a process name that the user was running, etc.

In some implementations, alongside the various data collected from the one or more data sources 104, a business enterprise can track control sequences or control level data. Control sequences include a sequence of controls that an employee or a user has used. Control sequences are a combination of keys and/or hot keys which can implicitly take part in process navigations. The control sequences can track or mirror other types of data collected. Control sequence data includes both control and printable characters. Control characters are non-printing characters (NPC) which represent a code point (or a number) in a character set that does not represent a written symbol. Printable characters are characters in the American Standard Code for Information Interchange (ASCII) printing range or more. Control sequence data including both control and printable characters allow a complete view of input sequence(s) provided by a user.

The process mining server 102 is configured to receive data from the one or more data sources 104 and discover one or more processes from the received data. The process mining server 102 can include one or more vectorizers 108 labeled as vectorizer 1, . . . vectorizer m. The one or more vectorizers 108 can include adaptors that allow reading of data obtained from the one or more data sources 104. For example, a vectorizer for converting keystroke logs to vectors can include adaptors that perform key-binning, a vectorizer for capturing text from images obtained via screen captures can include adaptors with optical character recognition (OCR), and so on.

In some implementations, the number of vectorizers in the one or more vectorizers 108 is equal to or less than the number of data sources in the one or more data sources 104 such that a same type of vectorizer can be used for a same type of data. For example, an application log file can have a similar structure to an IIS log file, therefore, a same vectorizer (e.g., vectorizer 1) can import data from the application log file and the IIS log file. On the other hand, the vectorizer 1 will be unable to import data from an image file since the vectorizer 1 is configured for structured text log files.

The one or more vectorizers 108 can tokenize data extracted via the adaptors. The one or more vectorizers 108 can then create vectors from the tokenized data. Once the vectors are created from the one or more vectorizers 108, vectors from disparate sources (from different data types) can be compared to each other in a same vector space.

The process mining server 102 can further include a process correlation engine 110. An engine is a combination of hardware and software configured to perform specific functionality. The process correlation engine 110 is configured to identify tasks and micro tasks from the vectorized data from the one or more vectorizers 108. The process correlation engine 110 can apply unsupervised learning to the vectorized data to predict and/or discover one or more processes from the vectorized data. For example, the process correlation engine 110 can use a long short-term memory (LSTM) artificial recurrent neural network (RNN) for classifying, processing, and making predictions based on the vectorized data. The vectorized data can retain time-series information such that the LSTM network can classify, process, and make predictions based on the time-series information in the vectorized data.

LSTM provides an advantage over feedforward neural networks since the vectorized data can include tasks or events that occur with an unknown duration separating occurrences. For example, individuals can take a varying amount of time to complete tasks since workers do not work at a constant speed, and individuals may prioritize other tasks or multi-task during a certain task. LSTM artificial RNNs allow memorizing events for a long period of time such that appropriate tasks relating to a process can be identified whenever they occur. LSTM is advantageous over traditional statistical techniques that break down when applied to business processes.

The process mining server 102 can further include a process coordination engine 112. The process coordination engine 112 can perform various tasks with the one or more processes identified by the process correlation engine 110. The process coordination engine 112 can, for example, perform process prediction, process conformance testing, process compression, process optimization, process clustering, or a combination thereof. The process coordination engine 112 can use various techniques in analyzing processes. For example, since events or tasks in a process are represented in vector space, the event vectors can be combined to form a process vector. Process vectors can lend themselves to vector analysis, such as dot products to determine similarity between two processes. Result of a dot product between two process vectors satisfying a similarity threshold can allow the process mining server 102 to determine that both process vectors refer to a same process. A process vector can also be called a process matrix, where the process matrix is comprised of multiple event vectors.

Enterprise process mining can be performed using embodiments of the present disclosure. To simplify discussion and unify concepts, examples will be used to illustrate process mining steps according to some implementations of the present disclosure. The examples are merely illustrative and are non-limiting.

Figure 2:
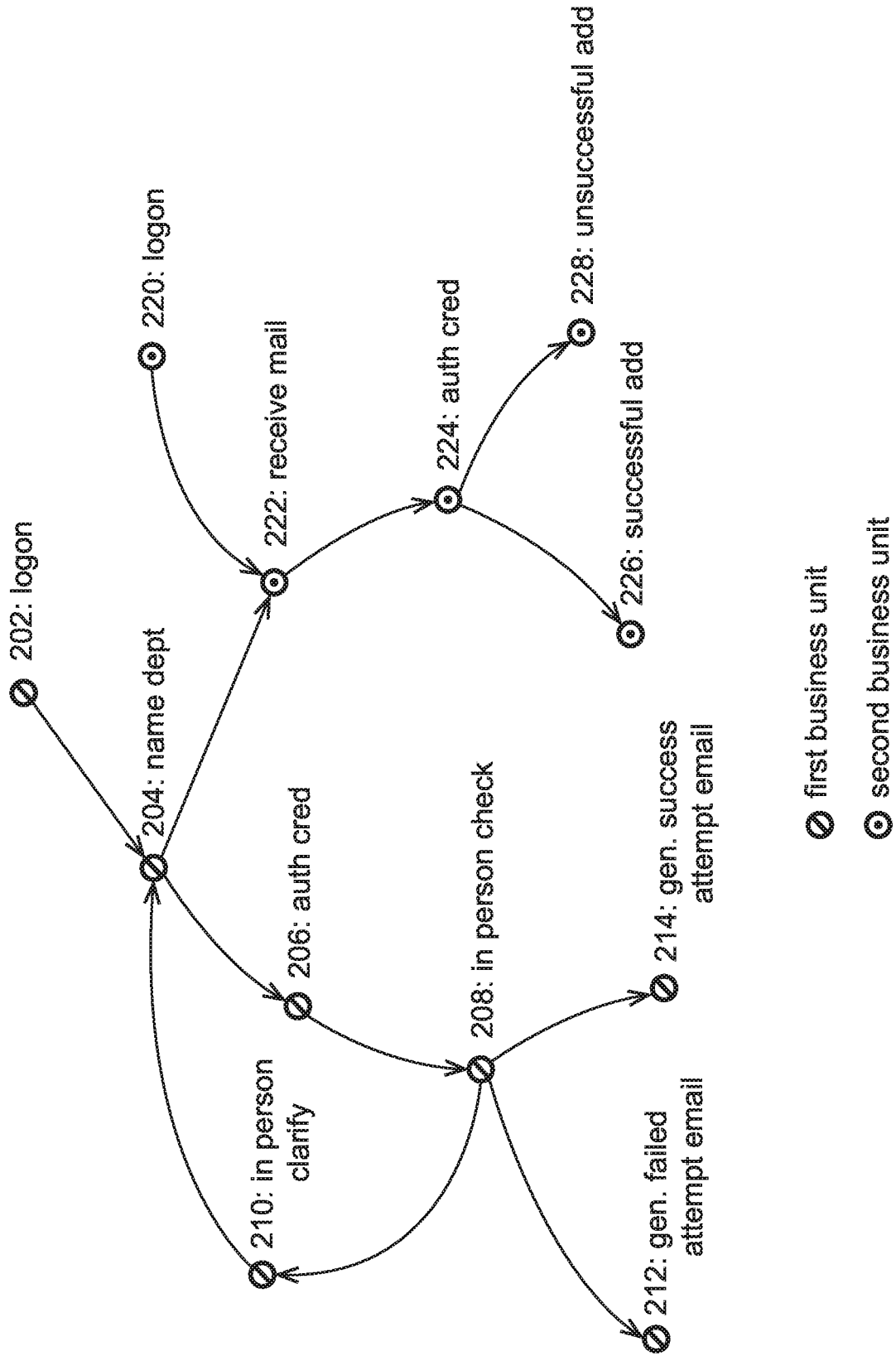
FIG. 2 illustrates an example process map showing at least two interrelated processes, according to some implementations of the disclosure.

Referring to FIG. 2, an example process map 200 showing at least two interrelated processes is provided according to some implementations of the present disclosure. The example process map 200 illustrates macro level tasks performed in adding an employee to business units within a business enterprise. Macro level tasks 202-214 are performed in a first business unit while macro level tasks 220-228 are performed in a second business unit. Descriptions of the macro level tasks and example data collected by the process mining server 102 are provided below.

Macro level task 202: Requestor logs in to computer and opens application A. Keystroke log data and other HCI data can be collected, and operating system control log indicating that application A is opened is collected.

Macro level task 204: Using application A, the requestor indicates that the employee should be added to the first business unit and the second business unit. Keystroke log data, screen capture data, and other HCI data can be collected. Application A's log can be collected indicating a control sequence in application A.

Macro level task 206: The employee's credentials are verified. Application A's log can indicate a request for credential verification of the employee in a database. Log files from the database can be collected which will include information relating to the computer running application A that requested the credential verification.

Macro level task 208: A second level verification by an individual is performed here once the database indicates that the employee's credentials are verified. Keystroke data, database log files, screen captures, etc., can be obtained. In some implementations, the verification is via a telephone or a video call, hence, voice and/or video data can be captured.

Macro level task 210: The individual performing second level verification can ask for more information or clarification, such as, for example, requesting a date of birth of the employee because there is conflicting information in the database. Voice data, keystroke data, image data, etc., can be obtained.

Macro level task 212: The individual performing second level verification can reject the request to add the employee, hence an email can be generated to inform the requestor. Examples of data that can be collected include contents of the autogenerated email, application log data for program autogenerating the email, screen capture, control sequence capture, etc.

Macro level task 214: The individual performing second level verification can approve the request to add the employee, hence an email can be generated to inform the requestor. Same types of data as macro level task 212 can be collected.

Macro level task 220: A steward in the second business unit logs in a computer and opens application C. Same types of data as macro level task 202 can be collected.

Macro level task 222: The steward retrieves requests from a repository (in this case, a request to add the employee to the second business unit). Application logs from application C, logs from the repository, etc., can be collected.

Macro level task 224: Similar to macro level task 206 described above. The employee's credentials are verified.

Macro level task 226: The employee is successfully added to the group once credential verification is successful, and an email can be sent to the requestor indicating success. The email contents can be collected.

Macro level task 228: The employee is not added to the group since credential verification was unsuccessful, and an email with an unsuccessful attempt is sent to the requestor.

The example process map 200 is a graphical illustration where one or more processes can be represented as an n-tuple. For example, a path from macro level task 202 to macro level task 214 can be represented as {202, 204, 206, 208, 214}. The n-tuple representation is one representation that the process mining server 102 can represent processes. The example process provided in FIG. 2 will be used to describe the flow diagram in FIG. 3.

Figure 3:
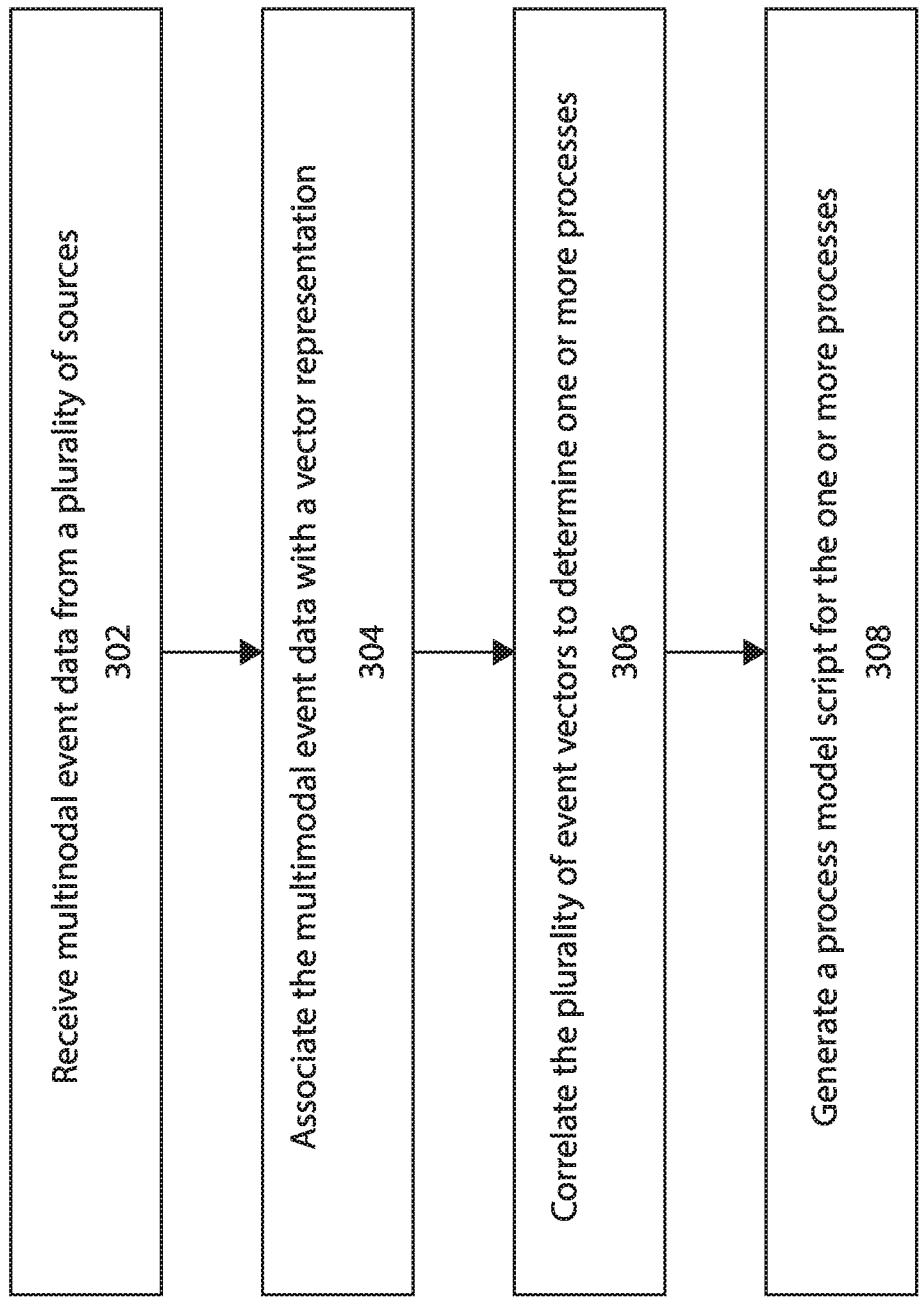
FIG. 3 is a flow diagram showing steps for discovering one or more processes using unsupervised learning, according to some implementations of the disclosure.

Referring to FIG. 3, a flow diagram 300 showing steps for discovering one or more processes using unsupervised learning is provided, according to some implementations of the present disclosure. At step 302, the process mining server 102 receives multimodal event data from a plurality of sources. Using FIG. 2 as an example, the process mining server 102 can receive keystroke logs, screen captures, application logs, video data, etc. Timestamps may be associated with each of these event data received. For example, if macro level task 210 is performed, keystroke log from the requestor at macro level task 204 can contain earlier keystrokes from when macro level task 204 was first performed. Multimodal event data collected can include event instances or can include SOP. Event instances are actual actions that were taken at some previous time step while an SOP can be an idealized process flow with ideal steps that should be taken.

In some implementations, the multimodal event data can be obtained in batches whereby the process mining server 102 requests data from the one or more data sources 104 at different intervals. In some implementations, the multimodal event data can be obtained in real-time such that the process mining server 102 can monitor progress of one or more processes and adjust hypotheses accordingly.

At step 304, the process mining server 102 associates the multimodal event data with a vector representation. The plurality of event instances (e.g., specific keystrokes, control sequences, etc.) are converted to vectors to obtain a plurality of event vectors. The plurality of event vectors places different event instances in a same space for purpose of comparing and relating the different event instances. Entity vectors can be used to handle multiple different modalities. Each event instance collected is an entity. The vectorizers 108 of the process mining server 102 include a neural network for determining the entity vectors (e.g., a neural network with two parameter matrices followed by an activation function).

In an example, words in sentences can be vectorized or word embeddings can be discovered using the concept of entity vectors. When training a neural network to determine word embeddings, word sequences in a sentence is treated as context. That is, words appearing in use closely together in multiple sentences have a higher probability of having some type of relationship to one another such as similarity, dissimilarity, prefix, suffix, co-occurrence, and association. As such, after discovering the word embeddings and plotting them in a vector space, these word embeddings can be in closer vicinity to each other. Similarly, for discovering business processes, the concept of context can be extended beyond sentences to training of embeddings of user and/or machine actions. A sequence of user and/or machine actions can provide context. The user actions and/or machine actions are collected as multiple modalities as described above in relation to FIGS. 1 and 2. The process mining server 102 treats sequences of user actions and/or machine actions as context in multiple modalities including image, text, audio, video, etc.

In some implementations, concept of entity vectors can be applied to images. For example, the process mining server 102 can compute a 255 dimensional vector on pixel intensity in every image. The process mining server 102 determines frequency of each pixel intensity to obtain the 255 dimensional vector. A 255 dimensional vector from a first image can be compared with a 255 dimensional vector from a second image. For example, a cosine similarity between the two 255 dimensional vectors can be used for similarity analysis, i.e., to determine how similar the two images are to each other.

In an embodiment, the process mining server 102 uses a Visual Geometry Group (VGG) convolutional neural network, e.g., VGG-16 (a type of neural network), to determine image embeddings. For example, using image word representation v from a last fully connected layer of the VGG network, and W being a hidden layer of embedding, a dot product between v and W (v·W) will provide an embedding code for an image.

In some implementations, the concept of entity vectors can be applied to audio (i.e., an audio Word2Vec approach). For example, Chung et al., "Audio word2vec: Unsupervised learning of audio segment representations using sequence-to-sequence autoencoder," arXiv preprint arXiv:1603.00982 (2016), which is hereby incorporated by reference in its entirety, includes representing audio segments using sequence-to-sequence autoencoder. The sequence-to-sequence autoencoder can accomplish unsupervised learning of Audio Word2Vec from audio data is without human annotation. Determining video embeddings or video entity vectors is an extension of determining image entity vectors previously described. Evaluating the representation of the embeddings in a video is to measure the similarity in frames which contain the representative images.

At step 306, the process mining server 102 correlates the plurality of event vectors using unsupervised learning to determine one or more processes within the multimodal event data. Referring to FIG. 2, step 306 involves identifying the different macro level tasks and identifying the transitions from one task to another. In some implementations, the process mining server 102 can use time windowing to group events into macro level tasks. Time windowing can be performed based on setting regular time intervals and grouping tasks within a same regular time interval. Time windowing can be performed based on events where events that are closer together in time are determined as being related. Time windowing technique for time series analysis and association can help reshape information (or events) initially by fixed windows. In some implementations, this initial approach of using fixed windows provides the most complete information possible in terms of vector embedding at a given time point. The initial fixed window can be later enhanced by sliding window.

In some implementations, when an SOP is provided as one of the multimodal event data, then identified events in the SOP are mapped to the plurality of event instances based on a timing relationship identified in the SOP. The SOP can contain different event names and different divisions, for example, the SOP can group macro level tasks 202 and 204 as one task. The process mining server 102 can use the SOP to restructure FIG. 2 accordingly to match the SOP. The process mining server 102 can also break from the SOP and provide the structure map 200.

Macro level task 204 leads to macro level tasks 206 and 222. Macro level task 206 can be an automated credential verification where a request is made to a database or an authentication server and a response is received. Macro level task 222 on the other hand adds a job to a queue, and the job has to be released manually by an individual who logs on at macro level task 220. The timing between when macro level tasks 206 and 222 occur can be very different. Depending on backlog, macro level task 222 can occur 10 minutes, 30 minutes, 4 hours, a day, two days, etc., after macro level 206.

Furthermore, both macro level tasks 206 and 222 occur at different business units. The process mining server 102 can still relate macro level tasks 206 to macro level task 222 via macro level task 204 due to collecting multimodal data including requests made from application A at macro level task 204. The process mining server 102 can relate macro level tasks 206 and 222 across the business units because of their originating from macro level task 204.

In some implementations, the process {220, 222, 224, 228} or {220, 222, 224, 226} occur much faster than {202, 204, 206, 208, 214} because of macro level tasks 204 and 208 which require people in the loop. In some implementations, the process {202, 204, 206, 208, 214} occurs much faster than {220, 222, 224, 228} or {220, 222, 224, 226} since the individual at macro level task 220 may be out for the week and the employee may not need credentials in the second business unit for at least two months. As such the process {202, 204, 206, 208, 214} is on a low priority. In these such cases, the process mining server 102 can still relate these processes to generate the process map 200.

RNNs recognize patterns in sequences of data. In some implementations, the process mining server 102 can train an RNN using the multimodal data in order to determine a relationship between the different macro level tasks identified in FIG. 2. For example, the process mining server 102 can employ LSTM artificial RNNs for predicting a next macro level task. LSTMs are a special kind of RNN that can learn long-term dependencies and effectively frame sequence prediction problems for RNNs. The process mining server 102 can train the LSTM, such that after seeing that macro level task 208 can occur in any order in relation to macro level task 224 with long time gaps between them, the LSTM can determine that macro level task 224 and macro level task 208 are on different branches and that it is unlikely that macro level task 224 follows macro level task 208 or vice versa. The LSTM can be used to predict that macro level tasks 212, 214, and 210 are most likely to follow macro level task 208.

Training of an RNN/LSTM requires training hyperparameters, i.e., input data, a number of layers of the network, a batch size, a number of training epochs, checkpoints and a final model. The training of the LSTM model is accomplished via backpropagation through time (BPTT), which is suitable for training feed-forward neural networks. BPTT is an enhancement on fixed-sized input-output pairs where sequence data is temporally ordered. Once trained, an LSTM will work for a specific sequence the LSTM was trained for (whether the sequence is a time series or any other recurrence). An example algorithm (pseudocode) for training an LSTM is:

Input: Time sequence input and output pairs to LSTM
Process: Calculate and accumulate errors for each timestep
Update weights
Repeat Input and Process steps.

At step 308, the process mining server 102 generates a process model script for the one or more processes. The process model script can be a robotic process automation (RPA) script. The RPA script can be stored in the process script repository 106 for later use. For example, the RPA script can be used for process automation, graphical process visualization, etc. Graphical representation of the process can be a directed graph, e.g., the directed graph of FIG. 2.

In some implementations, the process model script generated includes probabilities that show most likely pathways. That is, higher probability process pathways are highlighted. For example, in FIG. 2, process {202, 204, 206 208 214} may be highlighted or emphasized while the pathway involving {208, 210, 204} may be deemphasized.

Embodiments of the present disclosure provide several advantages over traditional process mining techniques. For example, in some business entities, candidate activities that can be automated for better return on investment are difficult to identify. Additionally, poor documentation of business processes, lack of understanding of current process flows and their changes over time, and/or deviation from a standard workflow may be reasons contributing to the difficulty. Embodiments of the present disclosure enable identifying processes that may deviate from the standard workflow, allow identifying steps that may not be included in the standard workflow, provide an updated workflow that can be graphically depicted, and can include timing information for identifying areas within the workflow that can be automated. The extracted or mined business process can be embodied as a set of tasks, which can be represented as micro actions or sub flows, as disclosed herein.

In some embodiments, the present disclosure provides a system that can extract information from user actions, such as, keypresses and mouse click from the desktop applications as well as applications opened in a web browser. The extracted information is mined at a control level and at a screen level. The system can find user entries or actions performed on each control of an application or a webpage. The system can find a screen level grouping of data with each row containing control details and their values for each page. The additional data being collected provides further insight that can be used in developing one or more processes associated with the user actions.

A software platform and method of automatically orchestrating a workflow is described in connection with FIGS. 4-11. The system and method use YAML to serialize (capture and store) a workflow, which is a collection of micro actions (steps, environment variables, and other configurations) for a business process. YAML is a superset of JavaScript Object Notation (JSON) and is a human-readable markup language.

```
{
  "json": [
    "rigid",
    "json is awesome for data interchange"
  ],
  "yaml": [
    "yaml is slim and flexible",
    "and therefore better for configuration"
  ],
  "object": {
    "key": "value",
    "array": [
      {
        "value_for_micro_action": null
      },
```

YAML supports every text-based environment, is json friendly, works in any text editor, is portable between programming languages, is expressive and also extensible. These attributes are leveraged in the present disclosure to represent a dynamic environment and a workflow extensively without running into structured format limitations. Disclosed herein are methods of unsupervised and self-supervised workflow extraction, and construction of micro actions to automatically orchestrate a workflow.

The following definitions may apply to the terms used herein. In general, terms familiar to those in the computer programming art will have their ordinary meaning as would be understood in the context of computer programming, information technology, and/or digital transformation.

Orchestration is the automated arrangement, coordination, and management of computer systems, middleware, and services.

A markup language in computer text processing is a system for annotating a document in a human-readable way that is syntactically distinguishable from the text, meaning when the document is processed for display, the markup language is not shown, and is only used to format the text. An example of a markup language suitable for use with the aspects of the present disclosure is YAML, which is colloquially referred to as YAML Ain't Markup Language, a human-readable data-serialization language having a structure that allows storage of multiple documents in a single file, and which also permits extensible type declarations, among other advantages over other markup languages.

A workflow is an orchestrated and repeatable pattern of activity, enabled by the systematic organization of resources into processes that transform materials, provide services, or process information.

A library is a collection of non-volatile resources used by computer programs, typically for software development.

The software platform herein includes extendable workflow components. Workflows are constructed or designed using components called micro actions from a micro action (software) library. These micro actions are extendable to create more meaningful, use-case based and end user-specific micro actions.

For example, a micro action to connect to HTTPS Services can be extended to create another micro action to connect to a Service Now or to a Sales Force Service as well as to change the parameters to make it more meaningful for a Service Now or Sales Force Service.

Workflow procedures can be reused. The workflow procedures created for automating a process can be reused in the same domain or in one or more different domains by converting them to a micro action and contributing back to the micro action library. Examples of domains include government, banking, insurance, healthcare, retail, travel, pharmaceutical.

A markup language is used as background for workflows and micro actions. Even though workflows and their components (e.g., micro actions and sub flows) are designed using a graphical interface, the workflow is stored in the background as a markup language (e.g., in YAML). This makes it easy to systematically generate workflows.

This feature adds more capability for artificial intelligence (AI) components to learn an existing Standard Operating Procedure (SOP) by reading the logs or using an over-the-shoulder learning capability, and converts those systematically to a workflow with little or no human interaction.

The software platform (sometimes referred to herein as CLONES, which is a trademark owned by the applicant of the present disclosure) provides a marketplace of domain-specific reusable micro actions and workflows. Users of the CLONES platform can contribute domain-specific reusable micro actions and workflows back to the platform. This capability allows the micro action libraries to be considered as a marketplace of reusable procedures.

Workflows are exposed to multiple Channels. The same workflow can be exposed to multiple channels of work intake such as Emails, SMS, Chats, ITSM Tickets, etc. just by configuring the channels. Channel configurations on the platform sense the incoming request, parse it, and applies its AI/ML capabilities to identify the workflow to execute.

The platform allows users to define workflows using the components called micro actions. A designer studio interface provides a library of drag-and-droppable micro actions or steps categorized based on its usage or type.

Figure 4:
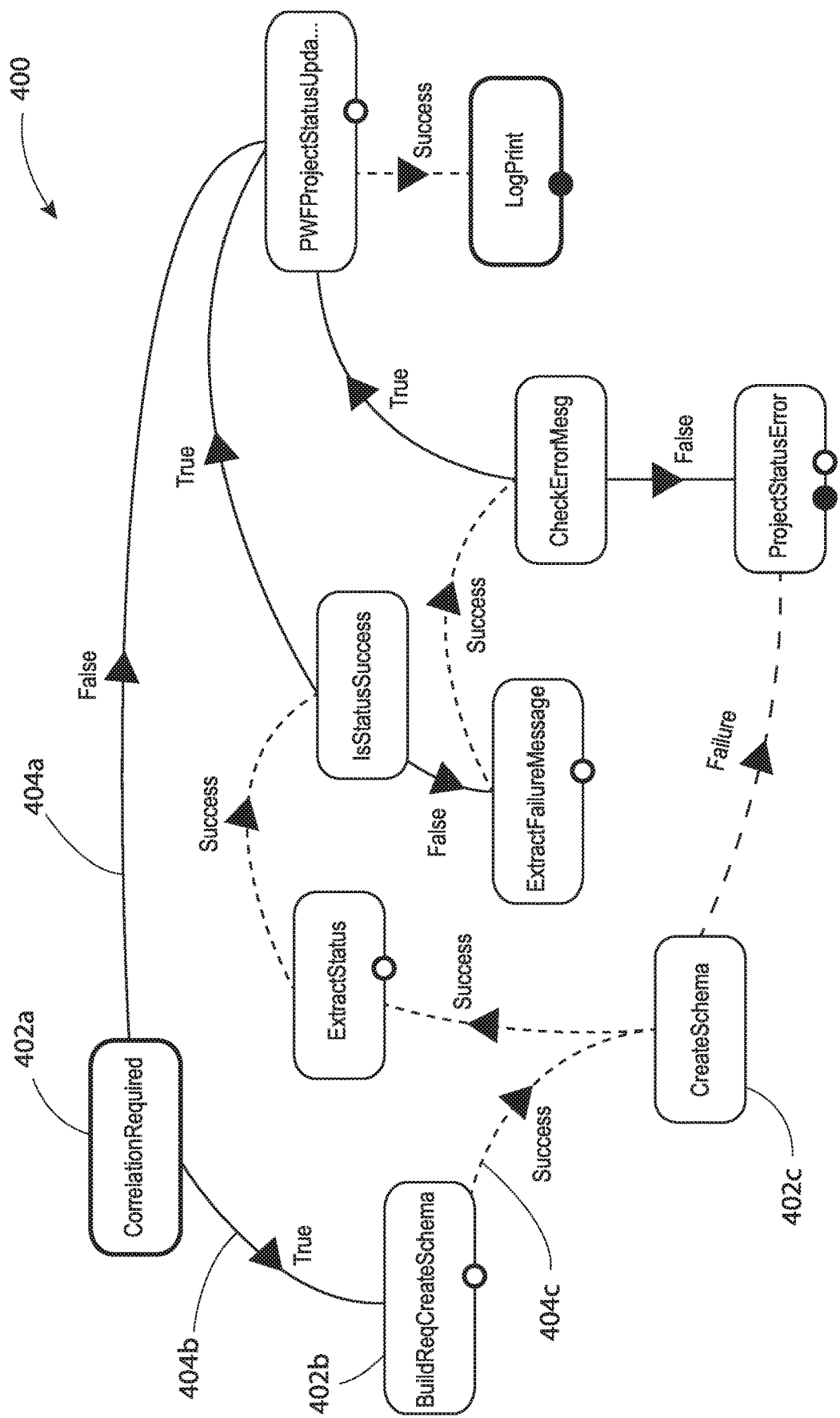
FIG. 4 is an example graphical user interface of a designer studio workspace in which a designer has dragged and dropped multiple micro actions and connected them together to form a workflow.

A workflow 400 as used herein can also be called a skill, which represents a procedure or process. An example skill or workflow 400 is shown in FIG. 4. A skill can include micro actions, e.g., 402*a*, 402*b* 402*c*, sub flows, and automation stories. Each micro action has a navigation flow, e.g., 404*a*, 404*b*, 404*c*, which can represent a normal navigation flow (e.g., true or success) or an alternate navigation flow.

Figure 5:
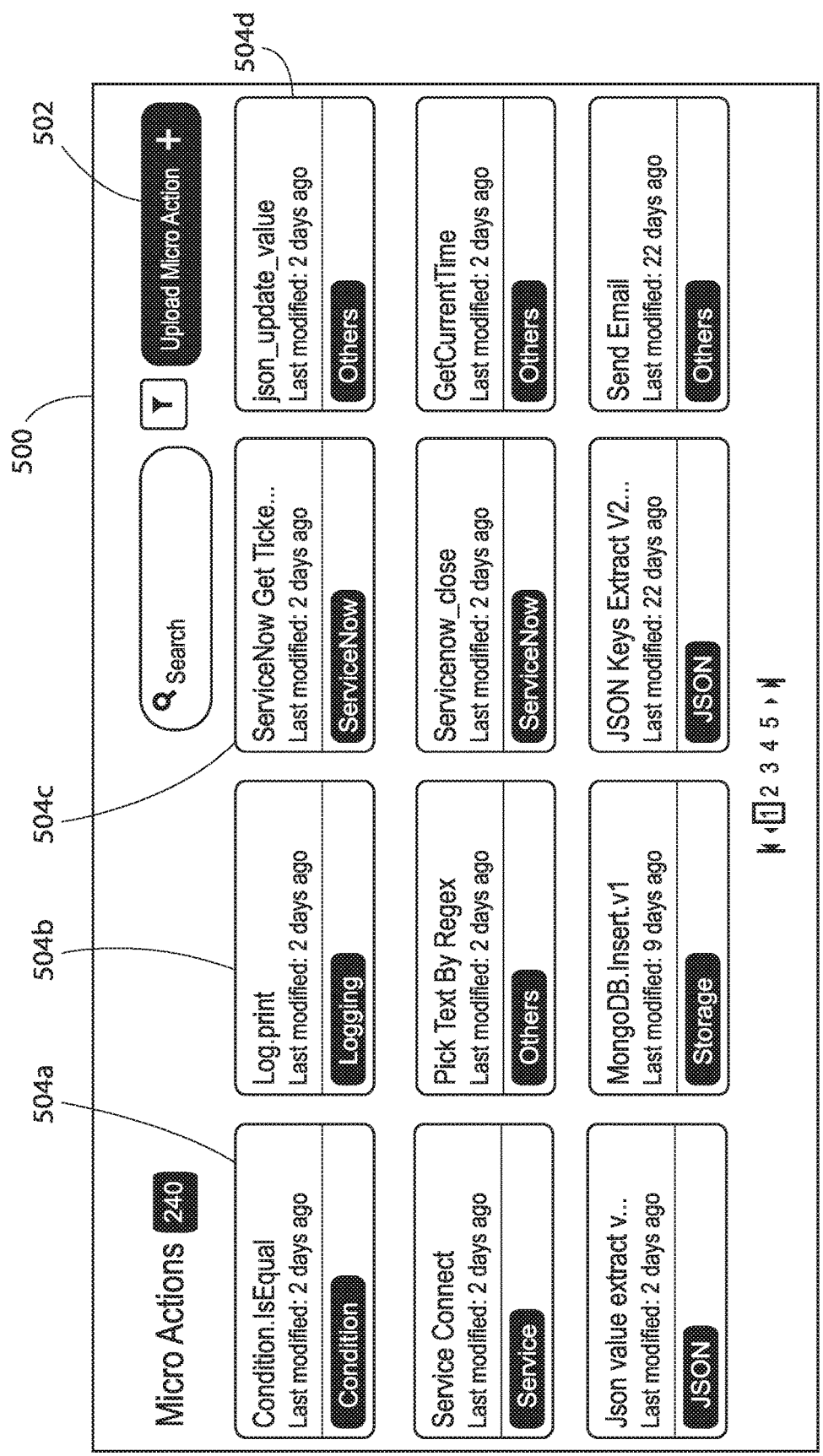
FIG. 5 is an example micro action palette available from the designer studio interface showing micro actions available for selection from a micro action software library, and each of the micro actions are depicted as draggable and droppable elements for facile incorporation onto the designer studio workspace to create a workflow composed of multiple interconnected micro actions.

An example of graphical elements 504*a*, 504*b*, 504*c* represented as a library of micro actions arrayed on a palette on a graphical interface 500 is shown in FIG. 5. A selectable element 502 allows a designer to add new micro actions or sub flows to the software library.

Micro actions are independent and reusable components, which can be used in an automated workflow for executing (using a computer processor) one single (computing) operation. Examples of an operation include a mathematical calculation, a rule, a communication or data connection to a remote system, querying an electronic storage device, or sending an email or SMS, etc. A micro action uses a markup-language based structure and is visualized as graphical elements 504*a*, 504*b*, 504*c* such as shown in FIG. 5. Micro actions selected from the palette 500 shown in FIG. 5 can be dragged and dropped by the designer onto the designer studio workspace 400, such as shown in FIG. 4.

Figure 6:
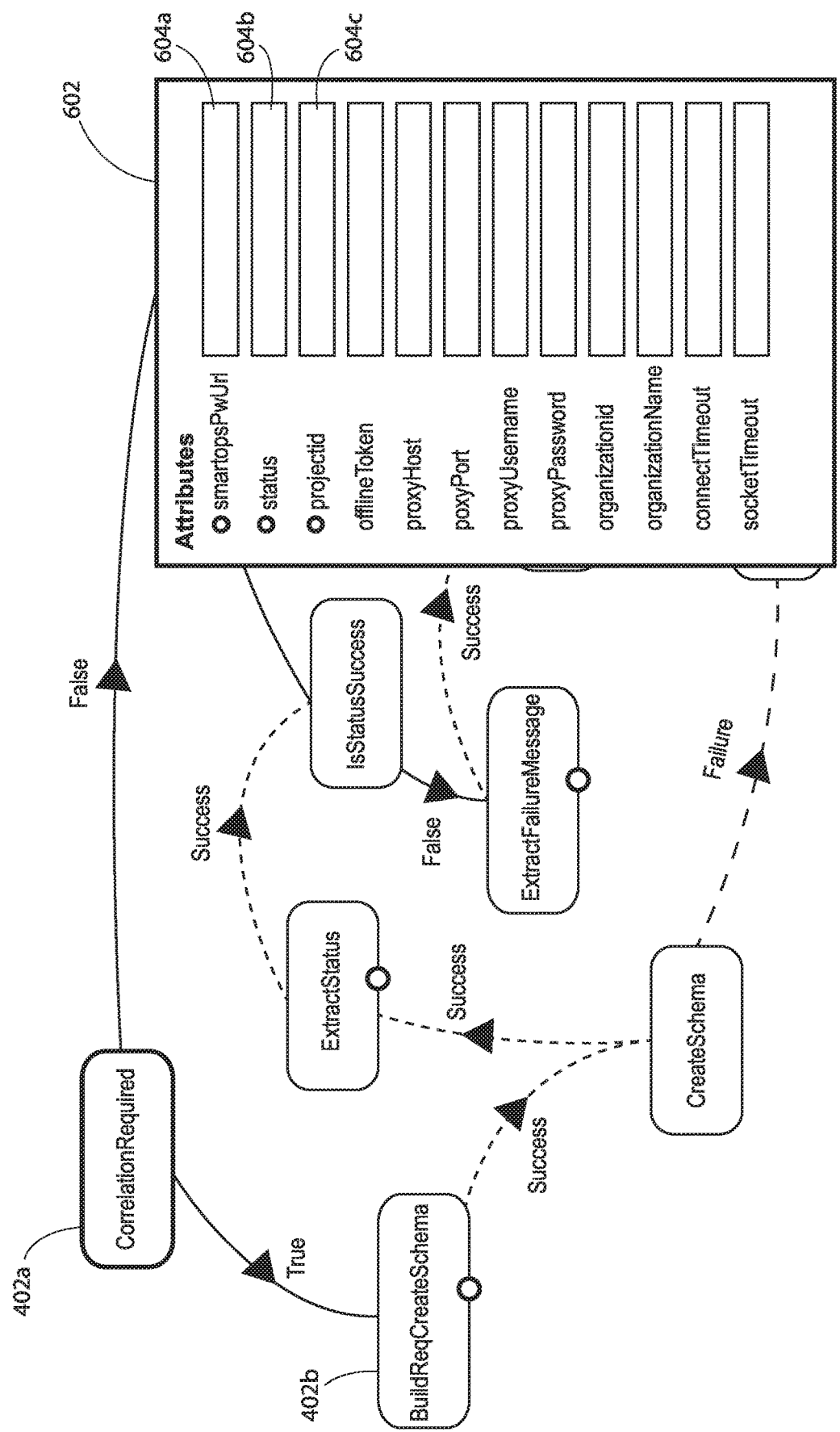
FIG. 6 illustrates an example pop-up window for a selected micro action in which the designer can enter values for various attributes of the micro action.

A micro action includes four sections:

1. Signature (or attributes), which defines the input parameters for the micro Action. Optionally, data types can also be defined, and options can be provided for setting the default value, confidentiality of the data to be captured, and necessity. FIG. 6 illustrates an example of attributes 604*a*, 604*b*, 604*c* of a micro action that can be defined by the workflow designer portrayed in a pop-up window 600. The attributes can be pre-populated with default values, and the designer can input values for some or all of the attributes 604*a*, 604*b*, 604*c* in the input fields provided.

2. The computer script or computer program that needs to be executed. A micro action can, e.g., be a piece of a Python or Java program embedded in or invoked from a markup language (e.g., YAML). In the case of Python scripting, users can create a script and upload the script using a graphical interface such as shown in FIGS. 4-11 under a category. The platform supports standard and commonly-used Python packages and makes it available for the designers who are contributing micro actions to the library. In case of Java, the platform allows designers to upload the Java archive files (.jar) to its repository and to invoke its classes and methods from the markup language.

Figure 7:
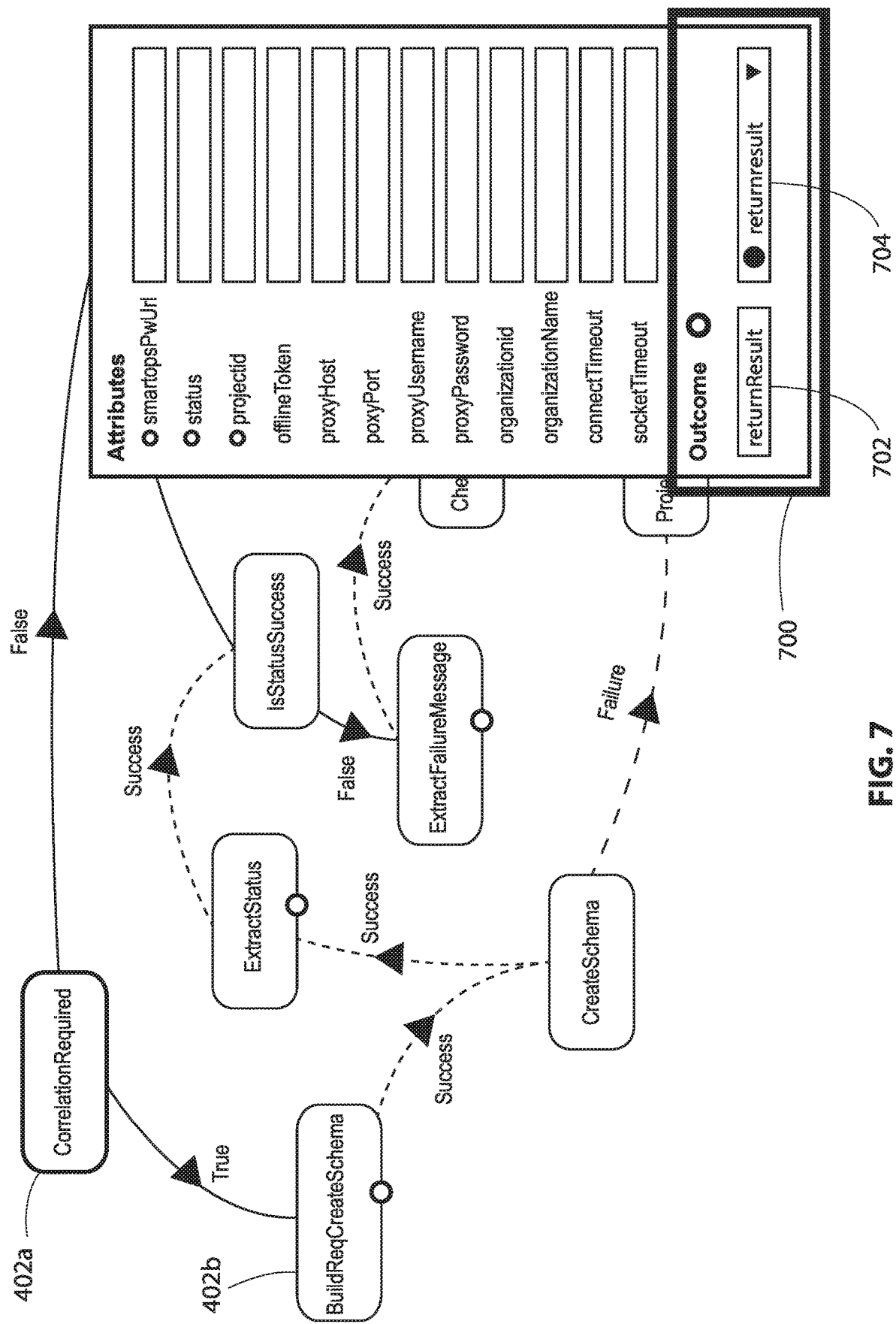
FIG. 7 illustrates an example navigation flow configuration for a selected micro action, allowing the designer to configure normal and alternate navigation flows based on an outcome or result of the micro action.

3. The output (or outcome) of the execution of the script or program. This section of the micro action allows the micro action to return the outcome of the script or program executed. E.g., the output can be set of values or a JSON or XML document or any combination of the foregoing. FIG. 7 illustrates an example outcome section highlighted in which a workflow or skill is storing the response of a micro action to a local attribute/variable called returnResult 702 so that it can be used as a response of the skill (workflow) or be passed to another micro action as its attribute, and its navigation flow 704 (which can also include an end operation so that no further micro action is called from the micro action's outcome).

Figure 8:
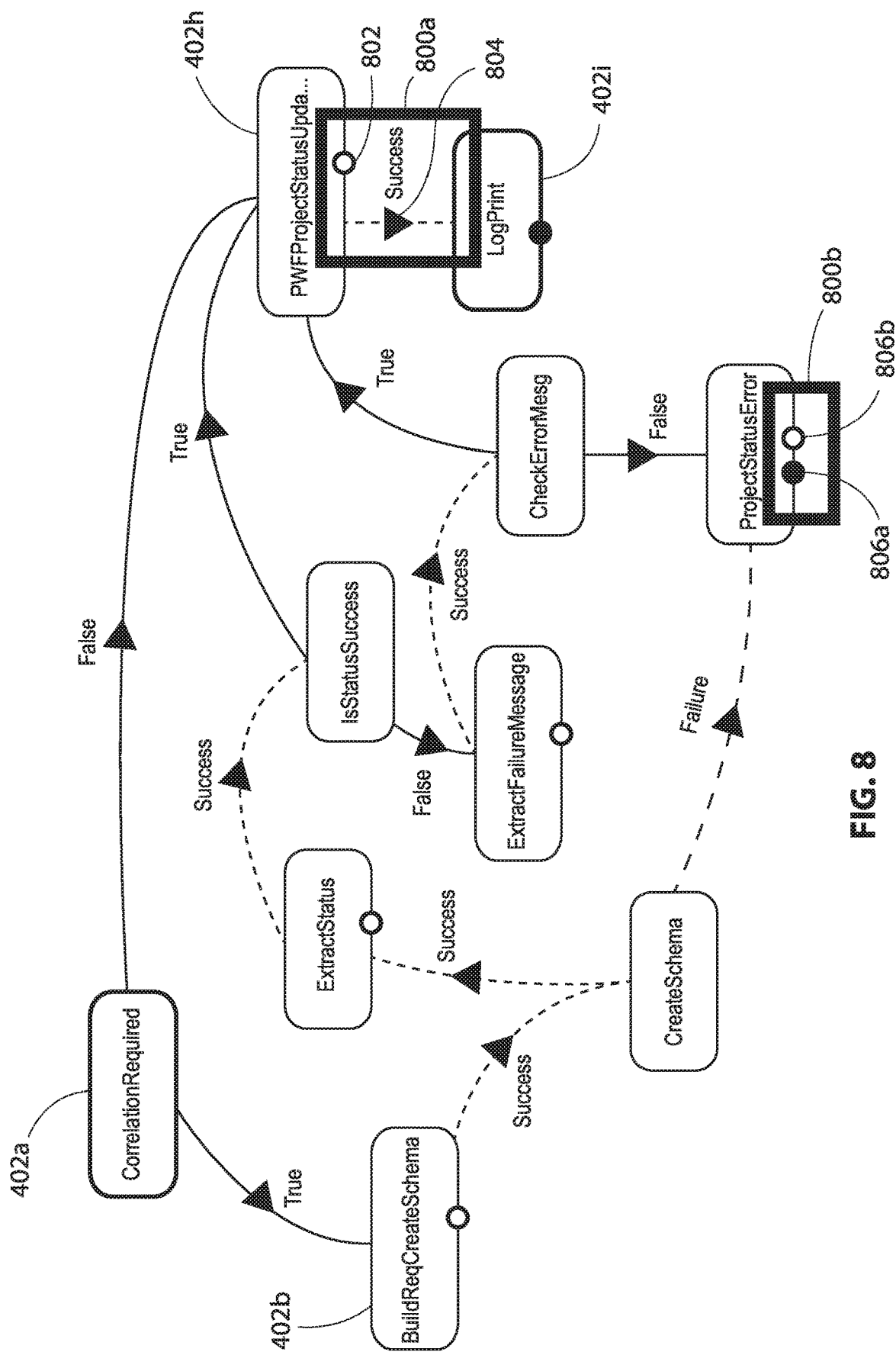
FIG. 8 illustrates an example designer studio workspace having multiple micro actions, and highlighting examples of normal and alternate navigation flows based on the outcomes or results of micro actions.

4. Options for Navigation—Normal navigation and alternative flows. Other than outcomes or results, micro action allows the configuration of normal navigation and alternate flows based on the results. The designer who develops the micro Action defines this Navigation option, this can be Numbers, True/False, Success/Failure, etc. (example configuration shown in FIG. 7). These navigation options allow the designer to define the path within the skill or workflow, in case of a normal or alternate flow. FIG. 8 illustrates example highlighted navigations 800*a*, 800*b*, wherein success 804 or failure options can be differentiated, e.g., using different colors (green for success, red for failure of the step). This feature supports normal 804, 806*a* and alternate 802, 806*b* navigation between the micro actions within the skill or workflow.

Micro Action Library

Figure 9:
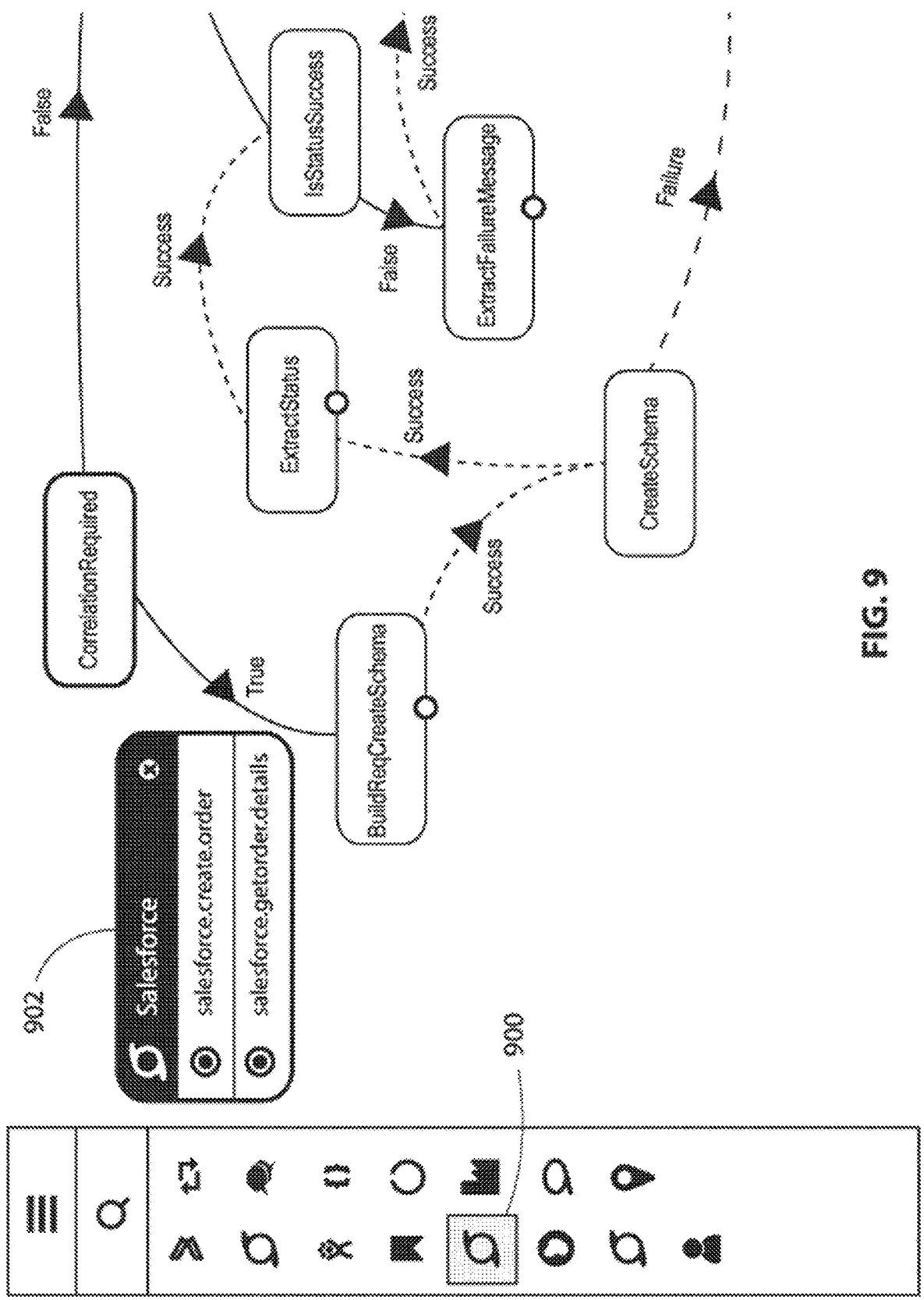
FIG. 9 illustrates an example micro action selected from the palette library of micro actions to create/retrieve a Salesforce order with the option to create a request for invoking the respective Salesforce order REST service.

A skill or workflow designer studio lists micro actions in a palette and allows the designer to drag and drop these micro actions onto a design workspace to define a skill or workflow. Designers can edit the properties of any micro action and provide values to their signature attributes. The attributes can be a fixed value or a value from a result of a previously executed micro action, or even an input to the entire skill or workflow from one or more external sources. Micro actions are categorized based on the type or purpose and are stored in the micro action library. Notably, an entire workflow or skill can itself be stored or encapsulated as a micro action. FIG. 9 illustrates a sample micro action from the palette to create/retrieve a Salesforce order 902 with the option to create a request for invoking the respective Salesforce order REST service. An icon 900 on the palette allows the designer to call up any micro action, which can be composed of one more sub flows.

Micro actions can be labeled. The designer of a skill or workflow advantageously can view outcome reports based on skill executions. This includes the completion of the process automation use cases as well as to define and trace alternate or error scenarios.

A use case can fail due to multiple reasons such as failure of a remote service, or a lack of response or action from the human-in-the-loop (HITL) and even due to failure of internal components of the platform. To identify and call out these cases, the platform allows the designer to tag or label a micro action added to the skill with a configurable set of labels like "Fulfilled", "Awaiting", "External Service Error", "Internal Service Error," etc. Based on the labels of last executed micro action, the reason behind the incomplete process automation can be traced and resolved.

Figure 10:
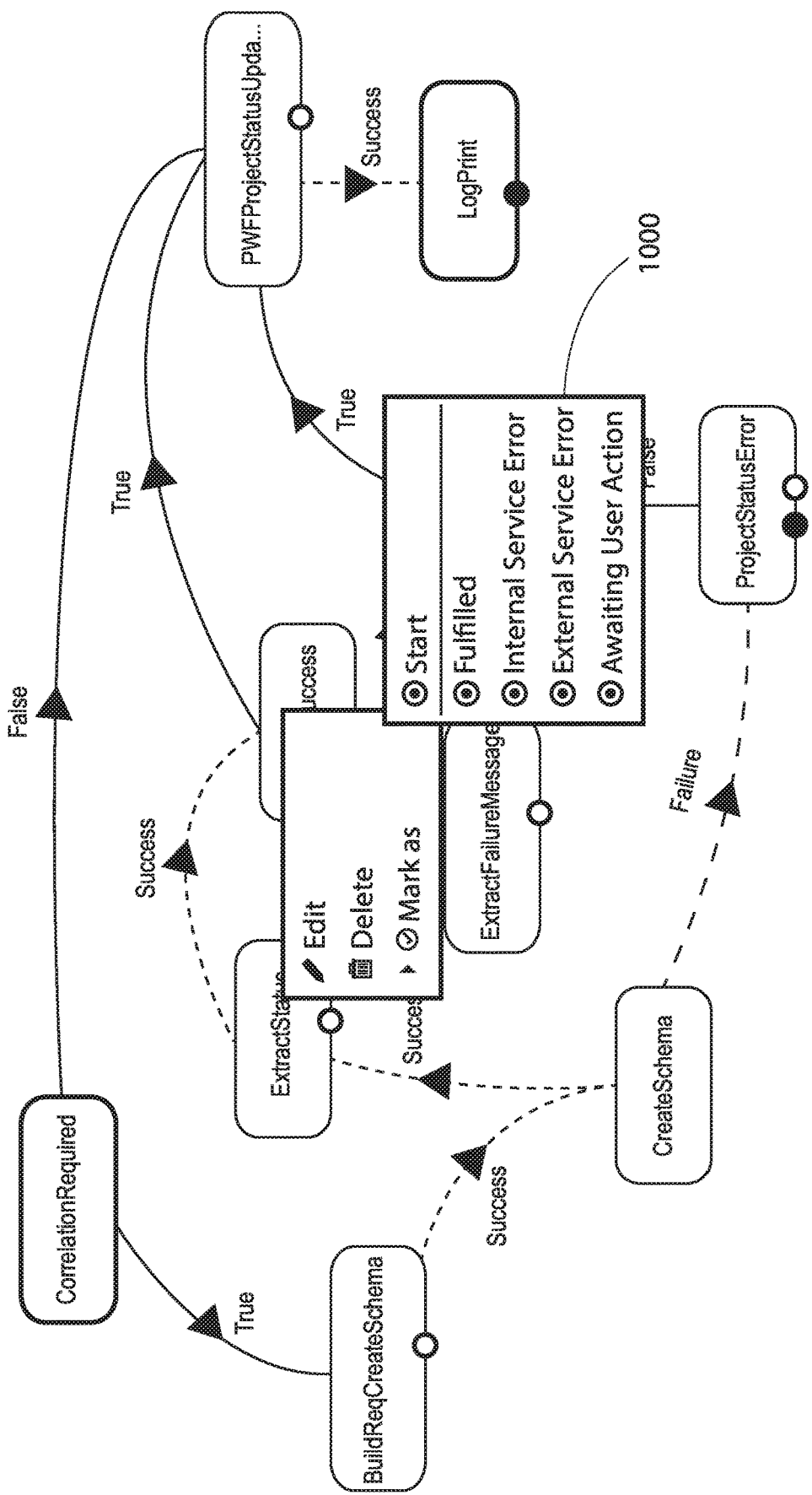
FIG. 10 illustrates how a selected micro action can be labeled against any of the exemplary configurable options displayed in FIG. 10, so that the normal and alternate flows can be traced.

FIG. 10 illustrates an example of an interface 1000 permitting a selected micro action to be labeled against any of these configurable options, so that the normal and alternate flows can be traced.

Reusable skills or workflows stored in the micro action library are called herein sub flows. From the usability perspective, sub flows work exactly like a micro action and can be dragged and dropped into the design workspace and will have the same features or sections mentioned as part of micro action. Sub flows help the designers of a skill to define reusable procedures across the use case and then use it accordingly when required. This not just helps for reusability of the skills but keeps them simple and readable.

The platform also allows a skill to be labeled as an automation story. A skill or workflow is independent and stateless. But for an entire use case to execute, multiple skills might need to be connected. The platform allows the design to label a skill with a use case name called an automation story.

Based on the request from the user through different channels like Emails, Chats or ITSM Tickets like Jira or Service Now, the platform executes a skill to complete the use case. Which skill to execute is identified either cognitively or with a specifically configured skill identifier. To complete the entire use case, the platform might call another skill within the first one and so on. But for traceability purposes, the execution needs to be tagged based on the first executed skill. And the platform consolidates execution of all these independent skills under the automation story label of the skill first executed based on the request. With this the platform provides outcome reports tracing the steps even though they are spread across multiple independent skills.

As mentioned above, an example of a markup language to construct the skills or workflows using the platform disclosed herein is YAML. YAML is used to automatically construct a skill document at run time (publish) based on the user inputs.

Figure 11:
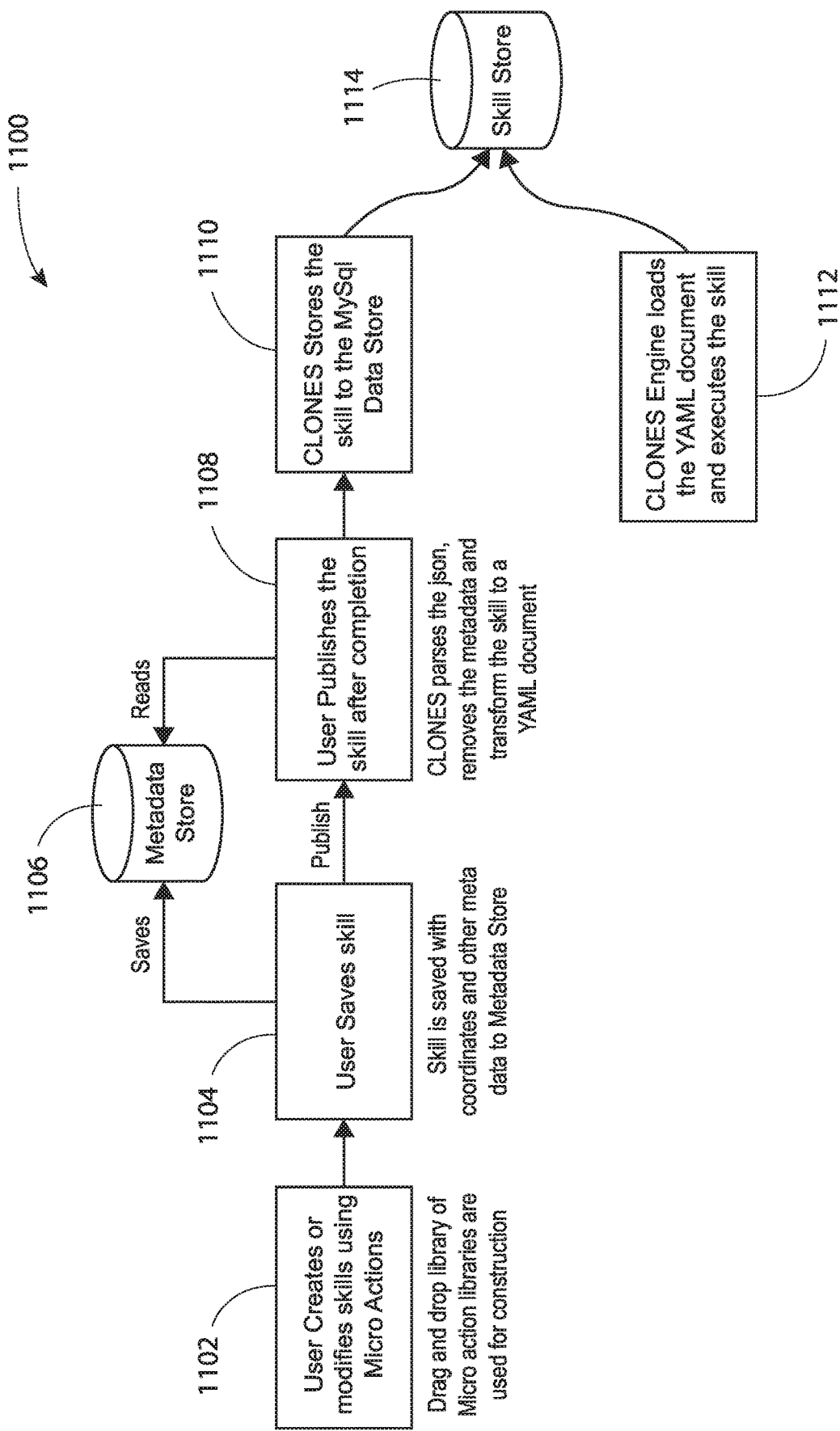
FIG. 11 illustrates an example flow for a designer to design or create a workflow or skill using micro actions from the micro action library.

FIG. 11 illustrates an example flow 1100 for designing a workflow (e.g., 400) or skill using micro actions. The user or designer creates or modifies a skill (workflow) using micro actions (1102). To do so, the designer can drag an drop micro actions directly onto a workspace from a micro action library. Once all the micro actions have been configured, the user saves the skill or workflow (1104), along with coordinates and other meta data, to a metadata store 1106. The skill is published after completion. In this example, the platform is referred to as CLONES, which is a trademark owned by the applicant of the present disclosure. The platform parses the j son, removes the metadata, and transforms the skill autonomously without any human input or intervention, to a markup language document, such as a YAML document (1108). During the transformation to the YAML document, the platform reads the metadata from the metadata store 1106 before removing it. The platform stores the skill to a MySql data store (1110), which is referred to as a skill store 1114, an electronic storage device that stores one or more skills or workflows as defined herein. The platform's engine loads the YAML document and executes the skill (1112), when called upon.

A sample micro action is provided below:

```
namespace: com.ust.clones
operation:
name: contains_operation
inputs:
- string
- contains_text
python_action
script:
response = contains_text in string
    if response is true:
        return_result = "True"
    else:
        return_result = "False"
    return_code = 0
outputs:
- return_result
- return_code: $ { str(return_code) }
```

-continued

```
- error_message
results:
- TRUE: $ {return_code == 0}
- FALSE
```

In the above sample micro action, the name space is used to categorize the micro action under headings. Operation consists of two sections: name and input. Name is a unique name to identify the micro action. Along with the namespace the fully qualified name of micro action will be com.ust.clones.contains_operation.

The input section of a micro action allows user to define the input parameters, and optionally a default value and/or the required status. An example of an input section of a micro action follows:

inputs:
string: {required: true, default: null}
contains_text: {required: true, default: null}

Python Script or Java Program

A micro action can provide a python script or a java program. In the case of python, users can program the script directly in the micro action as can be seen in the above code sample. And in the case of java, there will be provision to mention the java library, class name and the method (function) to execute along with that provision to pass the inputs to java method as signature/parameters.

Outputs and Results

Outputs are the response to be sent back to the skill that is invoking the micro action as part of its execution. In the above example, True or False will be send back to skill.

Results are for navigation purposes. Results help the skill to continue with the normal flow or with an alternate flow. In the above example, if the python script is executed properly, 0 will be stored in return_code, and if the value or return_code is 0, then the Result will be TRUE else FALSE.

Constructing a Skill from Micro Actions

Like a micro action, a skill in a YAML file likewise includes four sections: Namespace, Name, Inputs, Output and Result. These sections are same as in the case of micro action. However, instead of operation as in a micro action, a skill includes a section called workflow. A sample YAML code of a workflow is provided below:

```
workflow:
- create_ticket:
do:
invoke_rest_service:
- url
- auth_type" 'basic'
- username
- password
- content_type: 'application/___'
- body: C{"("description"1" ' +description+"', "short_description"' +short_description+"', "caller_id"1"'+caller_id+"')'}
- method: "POST"
- proxy_host
- Proxy_port
- connect_timeout
- socket_timeout
publish:
- return_result
- error_message
- return_code
- status_code
- response_headers
navigate:
- SUCCESS        : extract_incidentno_servicenow
- FAILURE        : FAILURE
- extract_incidentno_servicenow:
do:
```

```
extract_json:
- json_object: C (return_result)
- json_path: 'C.result.number'
publish:
- incident: C (return_result)
- return_code_data: C(return_code)
- exception : C (exception)
- jsonResult: C (json_object)
navigate:
- SUCCESS          : extract_sysid_servicenow
- FAILURE          : FAILURE
- extract_sysid_servicenow:
do:
extract_json:
- json_object: C (jsonResult)
- json_path: 'C.result.sys_id'
publish:
- sys_id:              C (return_result)
- return_code_data: C (return_code)
- exception         : C (exception)
- jsonResult: return_result
navigate:
- SUCCESS : SUCCESS
- FAILURE : FAILURE
```

The above YAML file is a skill or workflow to create a ServiceNow ticket and return the ticket ID back to the called skill or to the user. In this sample YAML file, create ticket, extract_incidentno_servicenow and extract_sysid_servicenow are the name of skill's steps and in the steps, the definitions like invoke_rest_service and extract_json are the micro actions.

While a designer drags and drop a micro action onto the designer workspace, a step name will be asked or the name of the micro action will be used as step as well the input will be captured. Based on the information provided a step will be defined in the metadata j son and will be stored with coordinates and other details. Once the user publishes the skill, the platform automatically parses the j son and converts that to a YAML file (see above sample), encrypts, and stores the file in, e.g., a My SQL database (DB) as shown in FIG. 11.

In the above example, a skill is created with 3 sections. The first section invokes a rest service, and the second and third sections parse its response to retrieve values. These are three independent steps but consolidated together as one single skill. While dragging and dropping a micro action in the skill, a section is generated by the platform dynamically.

Advantages of YAML are that it is composed of maps and lists, and it can be converted to Java/Python Hashmaps or lists, which makes it easier to attach another YAML object as a map value or list item. In the above example, invoke_rest_service is a YAML snippet embedded dynamically and automatically without any human intervention by the platform while creating the workflow.

Still referring to above example, this skill is for creating a ticket in service now. However, the skill consists of totally independent micro actions like rest service calls and j son extractions. This skill can itself be reused as a micro action. Similarly, a user from a particular domain, can create similar skills and can contribute those back to the repository or library.

A skill is executed using an HTTP service call. Creating an independent skill and associating it as part of another skill using a micro action to invoke using HTTP call and engine will execute the skill and return with the response as in the case of a micro action.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for discovering business processes using unsupervised learning, the system including a non-transitory computer-readable medium storing computer-executable instructions thereon such that when the instructions are executed, the system is configured to:
   receive multimodal event data from a plurality of sources associated with at least a first user and a second user, the multimodal event data including a plurality of event instances, the plurality of event instances including (i) keystroke activity for when a key was pressed and application telemetry associated with a software application in which the key presses were inputted and (ii) screen captures;
   associate the multimodal event data with a vector representation, such that the plurality of event instances is represented as a plurality of event vectors;
   correlate, via a neural network, the plurality of event vectors using unsupervised learning to identify one or more processes, wherein a first process of the one or more processes requires multimodal event data from the first user on a first device and the second user on a second device, the first device and the second device being separate devices;
   refine the one or more processes by:
       continuing to monitor, in real-time, the plurality of sources for more multimodal event data,
       determining that the multimodal event data received in real-time belongs to a second process in the one or more processes that is different from the first process,
       determining errors associated with the first process and the second process, and
       updating weights of the neural network based on the errors associated with the first process and the second process; and generate a process model script for the one or more processes, wherein the generated process model script includes graphical probability indications in the one or more processes.

2. The system of claim 1, further configured to correlate the plurality of event vectors by:
joining a first subset of the plurality of event vectors to create a first process matrix,
joining a second subset of the plurality of event vectors to create a second process matrix,
determining a similarity between the first process matrix and the second process matrix, the similarity measured as a dot product between the first process matrix and the second process matrix, and
identifying that the first process matrix and the second process matrix refer to a same process in the one or more processes based on the similarity being below a threshold.

3. The system of claim 1, further configured to correlate the plurality of event vectors by:
joining a first subset of the plurality of event vectors to create a first process matrix,
joining a second subset of the plurality of event vectors to create a second process matrix,
determining a similarity between the first process matrix and the second process matrix, the similarity measured as a dot product between the first process matrix and the second process matrix, and
identifying that the first process matrix and the second process matrix are different processes in the one or more processes based on the similarity being above a threshold.

4. The system of claim 1, further configured to correlate the plurality of event vectors using a long short term memory (LSTM) neural network.

5. The system of claim 1, wherein the process model script includes one or more directed graphs.

6. The system of claim 1, wherein the process model script is a robotic process automation (RPA) script.

7. The system of claim 1, wherein the plurality of sources includes two or more selected from the group consisting of: one or more Internet Information Services (IIS) log files, one or more Apache log file, one or more application log files, one or more standard operating procedure (SOP) manuals, one or more screen capture logs, one or more keystroke logs, one or more business process documents (BPDs).

8. The system of claim 1, further configured to apply an image contained in the screen captures to a VGG-16 convolutional neural network to obtain an image embedding as the vector representation of the image.

9. A method for discovering business processes using unsupervised learning, the method comprising:
receiving multimodal event data from a plurality of sources associated with at least a first user and a second user, the multimodal event data including a plurality of event instances, the plurality of event instances including (i) keystroke activity for when a key was pressed and application telemetry associated with a software application in which the key presses were inputted and (ii) screen captures;
associating the multimodal event data with a vector representation, such that the plurality of event instances is represented as a plurality of event vectors;
correlating, via a neural network, the plurality of event vectors using unsupervised learning to identify one or more processes, wherein a first process of the one or more processes requires multimodal event data from the first user on a first device and the second user on a second device, the first device and the second device being separate devices;
refining the one or more processes by:
continuing to monitor, in real-time, the plurality of sources for more multimodal event data,
determining that the multimodal event data received in real-time belongs to a second process in the one or more processes that is different from the first process,
determining errors associated with the first process and the second process, and
updating weights of the neural network based on the errors associated with the first process and the second process; and
generating a process model script for the one or more processes, wherein the generated process model script includes graphical probability indications in the one or more processes.

10. The method of claim 9, wherein correlate the plurality of event vectors comprises:
joining a first subset of the plurality of event vectors to create a first process matrix,
joining a second subset of the plurality of event vectors to create a second process matrix,
determining a similarity between the first process matrix and the second process matrix, the similarity measured as a dot product between the first process matrix and the second process matrix, and
identifying that the first process matrix and the second process matrix refer to a same process in the one or more processes based on the similarity being below a threshold.

11. The method of claim 9, wherein correlating the plurality of event vectors comprises:
joining a first subset of the plurality of event vectors to create a first process matrix,
joining a second subset of the plurality of event vectors to create a second process matrix,
determining a similarity between the first process matrix and the second process matrix, the similarity measured as a dot product between the first process matrix and the second process matrix, and
identifying that the first process matrix and the second process matrix are different processes in the one or more processes based on the similarity being above a threshold.

12. The method of claim 9, wherein correlating the plurality of event vectors is performed using a long short term memory (LSTM) neural network.

13. The method of claim 9, wherein the process model script includes one or more directed graphs.

14. A computer-implemented method of orchestrating a workflow, comprising the steps of:
receiving multimodal event data from a plurality of sources associated with at least a first user and a second user, the multimodal event data including a plurality of event instances, the plurality of event instances including (i) keystroke activity for when a key was pressed and application telemetry associated with a software application in which the key presses were inputted and (ii) screen captures;
associating the multimodal event data with a vector representation, such that the plurality of event instances is represented as a plurality of event vectors;
correlating, via a neural network, the plurality of event vectors using unsupervised learning to identify one or more processes, wherein a first process of the one or more processes requires multimodal event data from the first user on a first device and the second user on a second device, the first device and the second device being separate devices;

refining the one or more processes by:
  continuing to monitor, in real-time, the plurality of sources for more multimodal event data,
  determining that the multimodal event data received in real-time belongs to a second process in the one or more processes that is different from the first process,
  determining errors associated with the first process and the second process, and
  updating weights of the neural network based on the errors associated with the first process and the second process;

generating a process model script for the one or more processes, wherein the generated process model script includes graphical probability indications in the one or more processes;

storing the one or more processes as a plurality of micro actions in a software library, wherein each of the micro actions represents a computer program or operation programmed from at least a partially interpreted programming language and embedded in or invoked from a markup language, wherein the markup language includes a data serialization language, has a structure permitting storage of multiple documents in a single file or stream, and can automatically expand a reference to an environmental variable to allow one or more additional micro actions to be embedded in or invoked from the markup language, and wherein at least some of the micro actions are reusable across multiple digital transformation domains;

presenting at least a subset of the micro actions as distinct selectable graphical elements on a graphical palette element displayed on an electronic display;

receiving, via a human-machine interface device, a selection of a selected one of the distinct selectable graphical elements, which is dragged and dropped onto a design workspace displayed on the electronic display, wherein the selected one of the distinct selectable graphical elements corresponds to a selected one of the plurality of micro actions, the selected micro action including:
  a plurality of definable attributes defining one or more input parameters for the selected micro action,
  a script or program to be executed or invoked by the markup language,
  an outcome of the execution returned from the script or program executed or invoked by the markup language, and
  a configurable navigation option that specifies at least a normal navigation flow or an alternate flow based on the outcome to at least one other of the plurality of micro actions;

connecting using the configurable navigation option the selected one of the plurality of micro actions with at least the at least one other of the plurality of micro actions to generate a workflow, and responsive to an instruction to publish the workflow, automatically generating human-readable code in the markup language, the human-readable code including the selected one of the plurality of micro actions and the at least one other of the plurality of micro actions; and storing the generated workflow in the markup language to orchestrate the generated workflow as an automated process.

15. The method of claim 14, wherein correlate the plurality of event vectors comprises:
  joining a first subset of the plurality of event vectors to create a first process matrix,
  joining a second subset of the plurality of event vectors to create a second process matrix,
  determining a similarity between the first process matrix and the second process matrix, the similarity measured as a dot product between the first process matrix and the second process matrix, and
  identifying that the first process matrix and the second process matrix refer to a same process in the one or more processes based on the similarity being below a threshold.

16. The method of claim 14, wherein correlating the plurality of event vectors comprises:
  joining a first subset of the plurality of event vectors to create a first process matrix,
  joining a second subset of the plurality of event vectors to create a second process matrix,
  determining a similarity between the first process matrix and the second process matrix, the similarity measured as a dot product between the first process matrix and the second process matrix, and
  identifying that the first process matrix and the second process matrix are different processes in the one or more processes based on the similarity being above a threshold.

17. The method of claim 14, wherein the outcome includes one or more of a set of values or a json or xml document, the method further comprising:
  labeling the selected one of the micro actions to identify a reason for incomplete process automation, including a failure of a remote service, a lack of response from a human-in-the-loop, or a failure of one or more internal components.

18. The method of claim 14, further comprising receiving the instruction to publish the workflow, and responsive thereto, publishing the workflow by retrieving metadata associated with the stored workflow and automatically generating the human-readable code in the markup language without any human intervention or input.

19. The method of claim 18, wherein the publishing the workflow includes parsing a json script or an xml document associated with the stored workflow and extracting metadata from the workflow during the generating the markup language.

20. The method of claim 14, wherein the screen captures include an image, and wherein associating the multimodal event data with the vector representation includes applying the image to a VGG-16 convolutional neural network to obtain an image embedding as the vector representation of the image.

* * * * *